(12) United States Patent
Fiedler

(10) Patent No.: US 7,573,967 B2
(45) Date of Patent: Aug. 11, 2009

(54) INPUT THRESHOLD ADJUSTMENT IN A SYNCHRONOUS DATA SAMPLING CIRCUIT

(75) Inventor: Alan Fiedler, Niskayuna, NY (US)

(73) Assignee: SLT Logic LLC, Boston, MA (US)

( * ) Notice: Subject to any disclaimer, the term of this patent is extended or adjusted under 35 U.S.C. 154(b) by 581 days.

(21) Appl. No.: 11/173,226

(22) Filed: Jul. 1, 2005

(65) Prior Publication Data

US 2007/0006054 A1 Jan. 4, 2007

(51) Int. Cl.
H04L 7/00 (2006.01)
(52) U.S. Cl. ............... 375/355; 375/376; 375/287; 375/371; 714/709
(58) Field of Classification Search ........... 375/355, 375/376, 287, 371; 714/709
See application file for complete search history.

(56) References Cited

U.S. PATENT DOCUMENTS

| | | | |
|---|---|---|---|
| 5,970,093 | A | 10/1999 | de Lantremange |
| 6,141,378 | A | 10/2000 | d'Oreye de Lantremange |
| 6,882,208 | B1 | 4/2005 | Suissa et al. |
| 7,126,510 | B2 * | 10/2006 | Alon et al. ............... 341/120 |
| 7,209,525 | B2 * | 4/2007 | Laturell et al. ............ 375/316 |
| 2004/0091073 | A1 * | 5/2004 | Smith et al. ............... 375/355 |
| 2004/0120426 | A1 * | 6/2004 | Dagdeviren et al. ........ 375/340 |
| 2004/0202266 | A1 * | 10/2004 | Gregorius et al. ......... 375/355 |
| 2005/0058234 | A1 * | 3/2005 | Stojanovic ............... 375/371 |
| 2006/0188043 | A1 * | 8/2006 | Zerbe et al. ............. 375/346 |
| 2006/0253746 | A1 * | 11/2006 | Momtaz .................. 714/704 |

OTHER PUBLICATIONS

Stojanovic, "Adaptive Equalization and Data Recovery in a Dual-Mode (PAM2/4) Serial Link Transceiver", IEEE Symposium on VLSI Circuits, Jun. 2004.*
Stojanovic, "Autonomous Dual-Mode (PAM2/4) Serial Link Transceiver with Adaptive Equalization and Data Recovery", IEEE Journal of Solid-State Circuits, Apr. 2005.*

* cited by examiner

Primary Examiner—Juan A Torres
(74) Attorney, Agent, or Firm—Patterson, Thuente, Skaar & Christensen, P.A.

(57) ABSTRACT

A data sampler system receives a high-speed data stream and uses a first set of data samplers for sampling the data stream at a first set of clock phase angles to produce a first set of sequential data "eye" samples. A second set of data samplers, to sampled at a second set of clock phase angles that are different from the first set of clock phase angles to produce a second set of sequential data transition samples. The first set of data samplers, the data stream is sampled at the second set of clock phase angles to produce a third set of sequential data transition samples and with the second set data samplers, the data stream is sampled at a first set of clock phase angles to produce a fourth set of sequential data "eye" samples. The system alternates between the first mode and a second mode in which the results produce a reduced input offset voltage for the sampler system.

16 Claims, 6 Drawing Sheets

Fig. 1

| Fig. 1a | Fig. 1b |
|---------|---------|
| Fig. 1c | Fig. 1d |

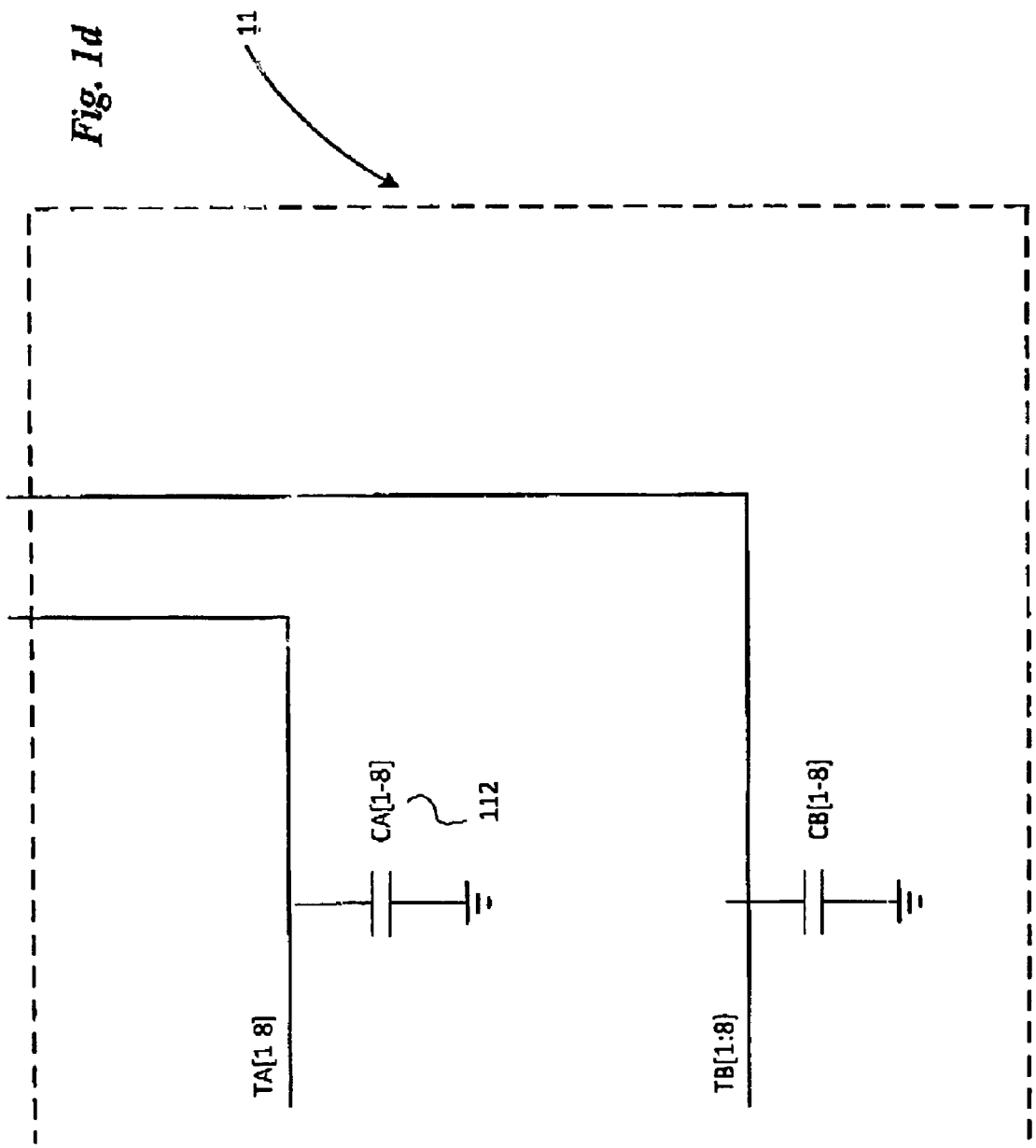

INPUT THRESHOLD ADJUSTMENT IN A SYNCHRONOUS DATA SAMPLING CIRCUIT

FIELD OF THE INVENTION

The present invention generally relates to integrated circuits, and more particularly to synchronous data sampling circuits, and systems and methods for monitoring and adjusting the input threshold of data sampling circuits.

BACKGROUND OF THE INVENTION

Data sampling circuits can exhibit a substantial input offset voltage that directly limits the minimum input signal level that can be successfully resolved by the sampling circuit. A method to measure and reduce input offset voltage allows for improved system performance through a reduction in error rate and/or a reduction in input signal amplitude and power consumption.

SUMMARY OF THE INVENTION

According to one aspect of the invention, a data sampling system includes a first data sampler set and a second data sampler set, each of which has an adjustable quantization threshold. The system further includes a mode sub-system adapted to selectively operate the first data sampler set for data transition sampling and the second data sampler set for data "eye" sampling in a first mode, and to selectively operate the first data sampler set for data "eye" sampling and the second data sampler set for data transition sampling in a second mode. The system is further adapted to facilitate mode switching between the first and second modes. A threshold adjustment sub-system is adapted to adjust at least one quantization threshold for at least one of the first and second data sampler sets.

According to another aspect, a method of receiving a high-speed data stream includes using a first data sampler set for sampling the data stream at a first set of clock phase angles to produce a first set of sequential data "eye" samples. With a second data sampler set, the data stream is sampled at a second set of clock phase angles that are different from the first set of clock phase angles to produce a second set of sequential data transition samples. With the first data sampler set, the data stream is sampled at the second set of clock phase angles to produce a third set of sequential data transition samples. With the second data sampler set, the data stream is sampled at a first set of clock phase angles to produce a fourth set of sequential data "eye" samples.

Other aspects of the invention include data sampling circuitry comprising a serial data input, at least a pair of data samplers adapted to sample the serial data, each having an adjustable input threshold, mode select means for supplying phase angle-selectable clock signaling to the data samplers such that the data samplers are individually configurable for data "eye" sampling or for data transition sampling and adjustment means for incrementally adjusting the input threshold for each data sampler based at least in part on previous data samples.

DETAILED DESCRIPTION OF THE PREFERRED EMBODIMENTS

Figure 1A:
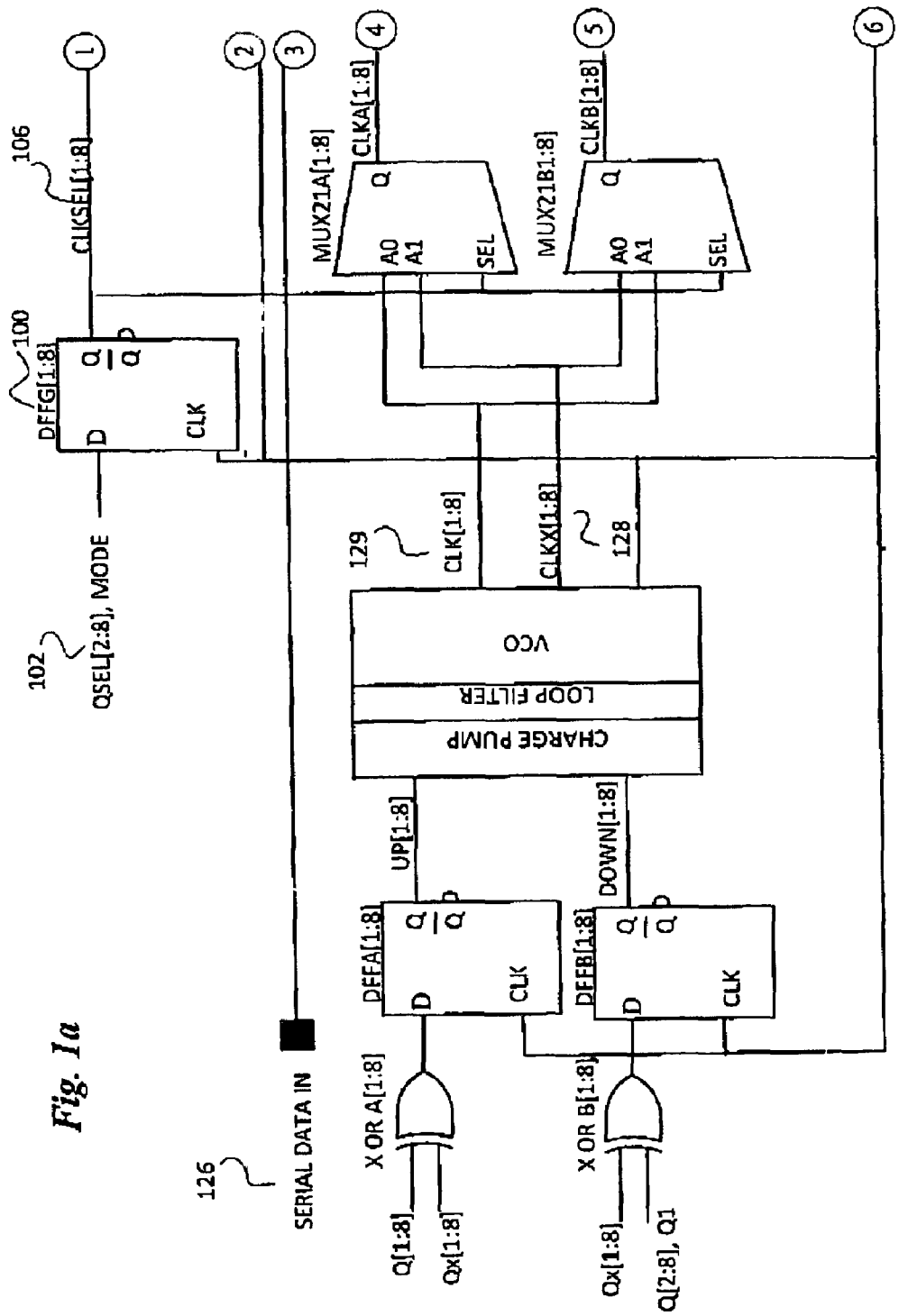
FIG. 1 is a logic-level schematic diagram illustrating an exemplary data sampling system according to one aspect of the present invention.

The present invention provides a system, circuits, and method for adjusting the input threshold voltage of data sampling circuits used in systems such as those used for clock and data recovery. Multiple data samplers sample the input data, with half the data samplers sampling the data transitions (the data transition samplers) and half the data samplers sampling the data between transitions (the data "eye" center samplers, referred to as an "eye" because the center sampler can produce eye-like pattern on an oscilloscope or logic analyzer). The input thresholds of the data transition samplers are continuously adjusted so as to reduce their input offset voltage to a low level. By periodically converting the functionality of data-eye center samplers to that of transition samplers (and at the same time the transition samplers to data-eye center samplers), the input offset voltage of all the samplers are reduced to a low level.

A first type of embodiment of the invention includes a data sampling system having reduced sampler input offset voltage comprising a first data sampler; a second data sampler; and a mode system for selectively alternating the first data sampler and the second data sampler to operate as a data transition sampler or a data eye sampler. In an exemplary embodiment, the data transition sampler is configured to sample data transitions and the data eye sampler is configured to sample in between data transitions.

A second type of embodiment of the invention comprises a data sampling system including multiple data sampling circuits (data samplers), each of which, on the transition of its input sample-clock, will sample, amplify, and convert an input data signal to a first logic level when the input data level is below a threshold, and to a second logic level when the input data level is above a threshold. Thus, the threshold can be thought of as a quantization threshold. Multiple input sample-clocks are distributed in phase substantially equally about 360 degrees, with each input sample-clock connected to one or more data samplers. The system also includes circuitry by which the phase of the input sample-clocks is adjusted such that a portion of the data samplers (the data transition samplers) will sample the input data at the time that it may transition across a threshold, and a portion of the data samplers (the data eye samplers) will sample the input data at the time midway between the possible input data transitions; circuitry by which the function of each data sampler can be reversed such that a data sampler which had been operating as a data transition sampler is reconfigured to operate as a data eye sampler, and a data eye sampler is reconfigured to operate as a data transition sampler; and circuitry by which each data transition sampler's input threshold is adjusted such that, when sampling a data transition, will be equally likely to convert the input data to the first logic level as the second logic level, on average.

In one embodiment, the transition data samplers and data eye samplers each further comprise an input threshold control input. In another embodiment, the means by which the input threshold of each data transition sampler is adjusted comprises the detection of a data transition by logically combining the outputs of the data eye samplers preceding and following (in time) the data transition sampler; when a data transition is detected and the data transition sampler's output is a first logic level, adjusting the data transition sampler's input threshold control input so as to increase the likelihood that, in the event of a subsequent data transition, the data transition sampler will convert the transitioning input data to a second logic level; and when a data transition is detected and the data transition sampler's output is the second logic level, adjusting the data transition sampler's input threshold control input so as to increase the likelihood that, in the event of a subsequent data transition, the data transition sampler will convert the transitioning input data to the first logic level. In an alternate embodiment, the adjustment of the threshold control input of the data transition sampler is accomplished by use of a charge pump and integrating capacitor.

An exemplary embodiment of the invention requires that the input sample-clocks are distributed sequentially in phase from 0 to 360*((n−1)/n)) degrees, the sample-clocks comprising every other clock phase are the transition sample-clock phases, the remaining clocks are the data eye center sample-clock phases, and there are a total of n sample clock phases.

The system of the instant invention as set forth above, in one exemplary embodiment of the invention, is such that the data samplers are grouped into pairs of first and second data samplers, and further comprising for each pair of data samplers a first clock multiplexer connecting to the first data sampler's sample-clock input, selecting between a transition sample-clock phase and a data eye center sample-clock phase by using a clock select input; a second clock multiplexer connecting to the second data sampling circuit's sample-clock input, selecting between the data eye center sample-clock phase and the transition sample-clock phase by using the clock select input; a first data multiplexer selecting between the first data sampler's output and the second data sampler's output by using an output select input; and a second data multiplexer selecting between the second data sampler's output and the first data sampler's output by using the output select input.

The system of the aforementioned embodiment, in reference to the pairs of first and second data samplers, can be further characterized in that, the output of the first data multiplexer represents a data eye center sample; the output of the second data multiplexer represents a data transition sample; the clock select input is toggled between a first logic state and a second logic state; and the output select input is toggled between the first logic state and the second logic state at a time delayed from the clock select input transition. Furthermore, the mechanism by which the input threshold of each data transition sampler is adjusted, as set forth in an abovementioned embodiment, further comprises the logic and charge pump circuits 11 of FIG. 1.

The third type of embodiment of the invention is a data sampling system having reduced sampler input offset voltage comprising a first set of data samplers; a second set of data samplers; and a mode system for selectively alternating the first set of data samplers and the second set of data samplers to operate as data transition samplers or data eye samplers.

Persons skilled in the relevant arts will recognize that embodiments of the instant invention will include a method of sampling data using the data sampling system described above, as well as a high speed data system including the data sampling system described in the foregoing paragraphs in this section.

Figure 1B:
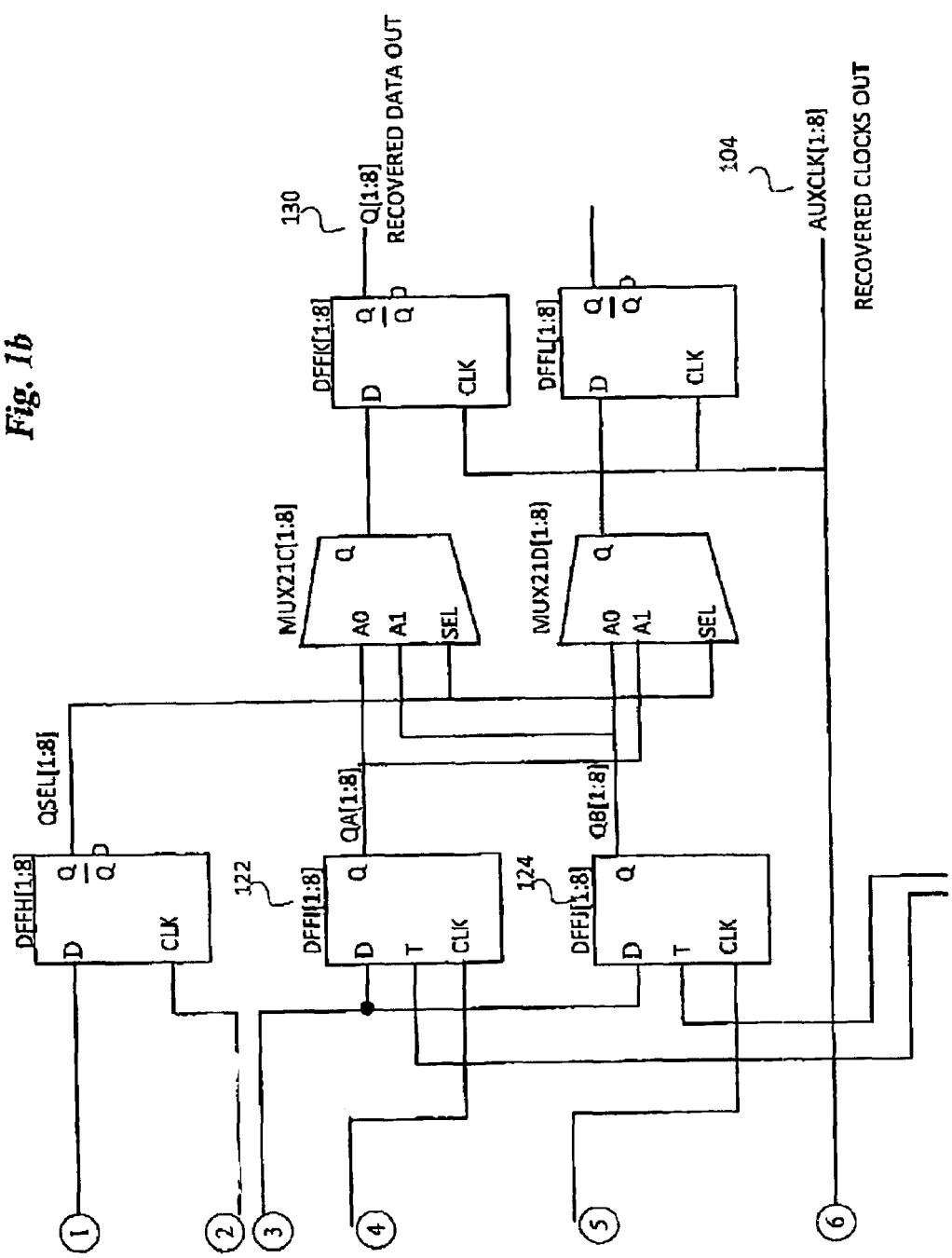
Figure 1C:
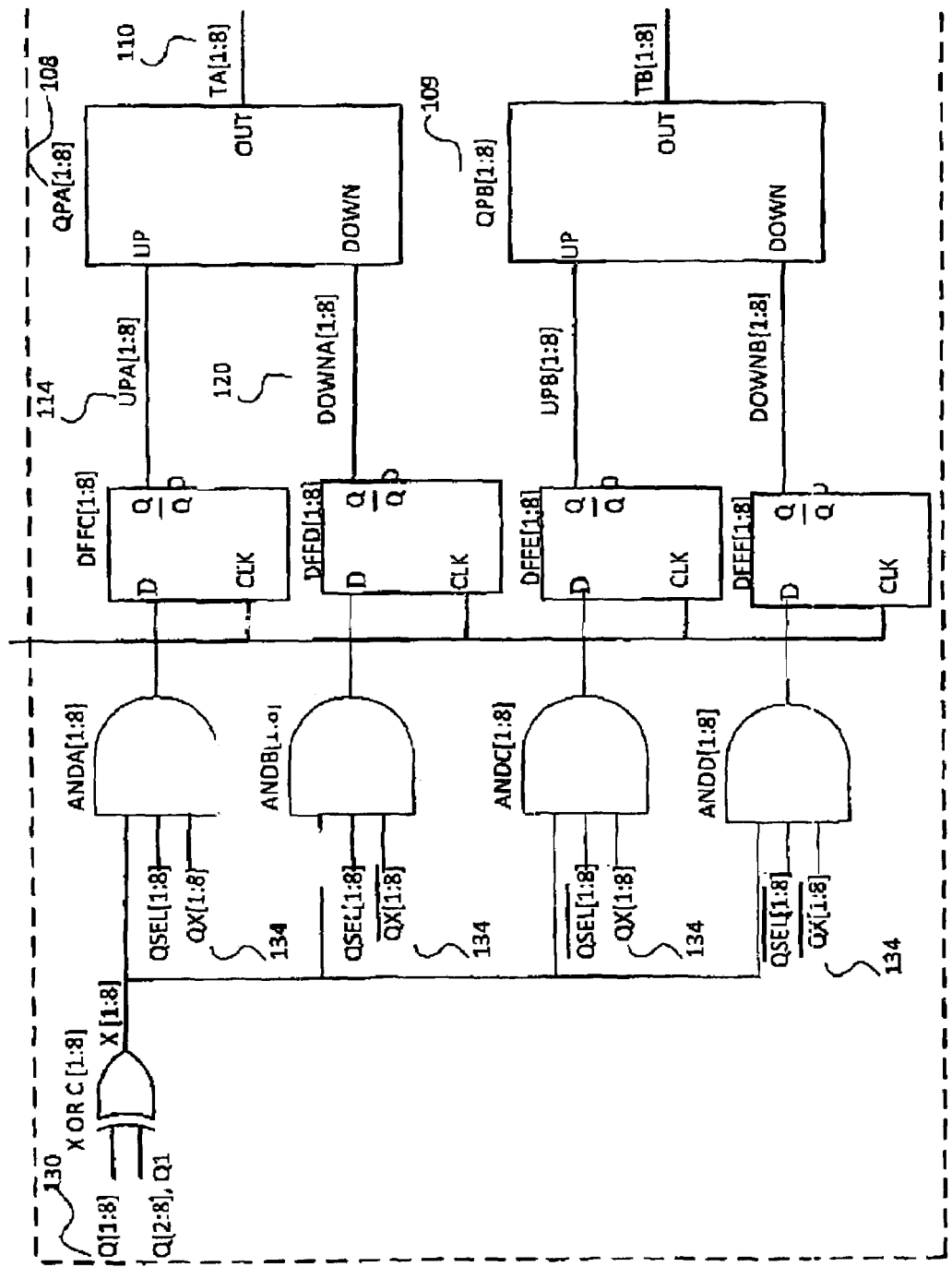

Referring now to FIG. 1, a logic-level diagram is shown illustrating an exemplary system. All logic gates in this figure are arrays of 8 elements and all nets but "SERIAL DATA IN" are 8-signal busses. The $n^{th}$ logic gate in any 8-gate array connects to the $n^{th}$ signal in each bus connecting to that 8-gate array. For example, for element DFFG[1] of the array DFFG[1:8] 100, the D input connects to QSEL[2] 102, the CLK input connects to AUXCLK[1] 104, and the Q output connects to CLKSEL[1] 106.

The arrays QPA[1:8] 108 and QPB[1:8] 109 are each arrays of 8 charge pumps. QPA[1] 108, for example, will source a current from its output OUT onto TA[1] 110 and integrating capacitor CA[1] 112 when UPA[1] 114 is high, and will sink a current into its output OUT from TA[1] 110 and integrating capacitor CA[1] 112 when DOWNA[1] 120 is high.

The D-type flip-flop in arrays DFFI[1:8] 122 and DFFJ[1:8] 124 has a threshold control input T. As the voltage at this input is raised, the input threshold at the D input rises. As the voltage at this input is lowered, the input threshold at the D input falls. The input threshold at the D input is defined as that voltage above which the Q output will go high when the CLK input transitions from low to high, and below which the Q output will go low when the CLK input transitions from low to high. For certain applications, these specialized D-type flip-flops with a threshold control input are best constructed with differential D and/or T inputs, rather than the single ended type shown here.

The VCO in this FIGURE is a voltage controlled oscillator which generates a total of 16 clock phases, evenly distributed about 360 degrees. Using the system in FIG. 1, when this oscillator is in lock to the incoming SERIAL DATA 126, the clocks CLKX[1:8] 128 will sample the data transitions, and the clocks CLK[1:8] 129 will sample between the data transitions (i.e., the center of the data eye). The phase relationship between these 16 clocks is such that CLK[n] leads CLKX[n] for n=1,2, . . . , 8, and CLKX[n] leads CLK[n+1] for n=1,2, . . . , 8. Additionally, auxiliary clock AUXCLK[n] is substantially in phase with CLK[n] for n=1,2, . . . , 8. Other types of circuits to generate clocks locked to the serial input data are possible, such as those employing a multi-phase mixer.

Different size systems similar to that in FIG. 1 can be illustrated using signal busses and arrays of elements of a different size by replacing the integer 8 with any integer equal to or greater than 2 in this figure. For example, to illustrate a system with 12 data samplers (6 transition samplers and 6 data eye center samplers) and 12 sample clocks (6 transition sample clocks and 6 data eye center sample clocks), every instance of the integer 8 in FIG. 1 would be replaced with the integer 6.

The recovered data outputs Q[1:8] 130 are 8 time-sequential data eye center samples of the serial input data, and the recovered clock outputs AUXCLK[1:8] 104 are 8 clock phases, evenly distributed about 360 degrees and synchronous with both the recovered data outputs and the serial input data. The data outputs QX[1:8] 134 are the sampled values of the serial input data transitions. The circuits in FIG. 1 process the sixteen data samples Q[1:8] 130 and QX[1:8] 134 so as to lock the phase and frequency of the VCO to the serial input data and also to reduce the input offset voltage of the data samplers DFFI[1:8] 122 and DFFJ[1:8] 124.

The MODE input 102, connecting to the D input of flip-flop DFFG[8] 100, controls the function of input data samplers DFFI[1:8] 122 and DFFJ[1:8] 124. When MODE is high, data samplers DFFI[1:8] 122 sample the serial input data transitions and data samplers DFFJ[1:8] 124 sample the points between the serial input data transitions. When MODE is low, this functionality is reversed, with data samplers DFFJ[1:8] 124 sampling the serial input data transitions and data samplers DFFI[1:8] 122 sampling the points between the serial input data transitions.

Figure 2:
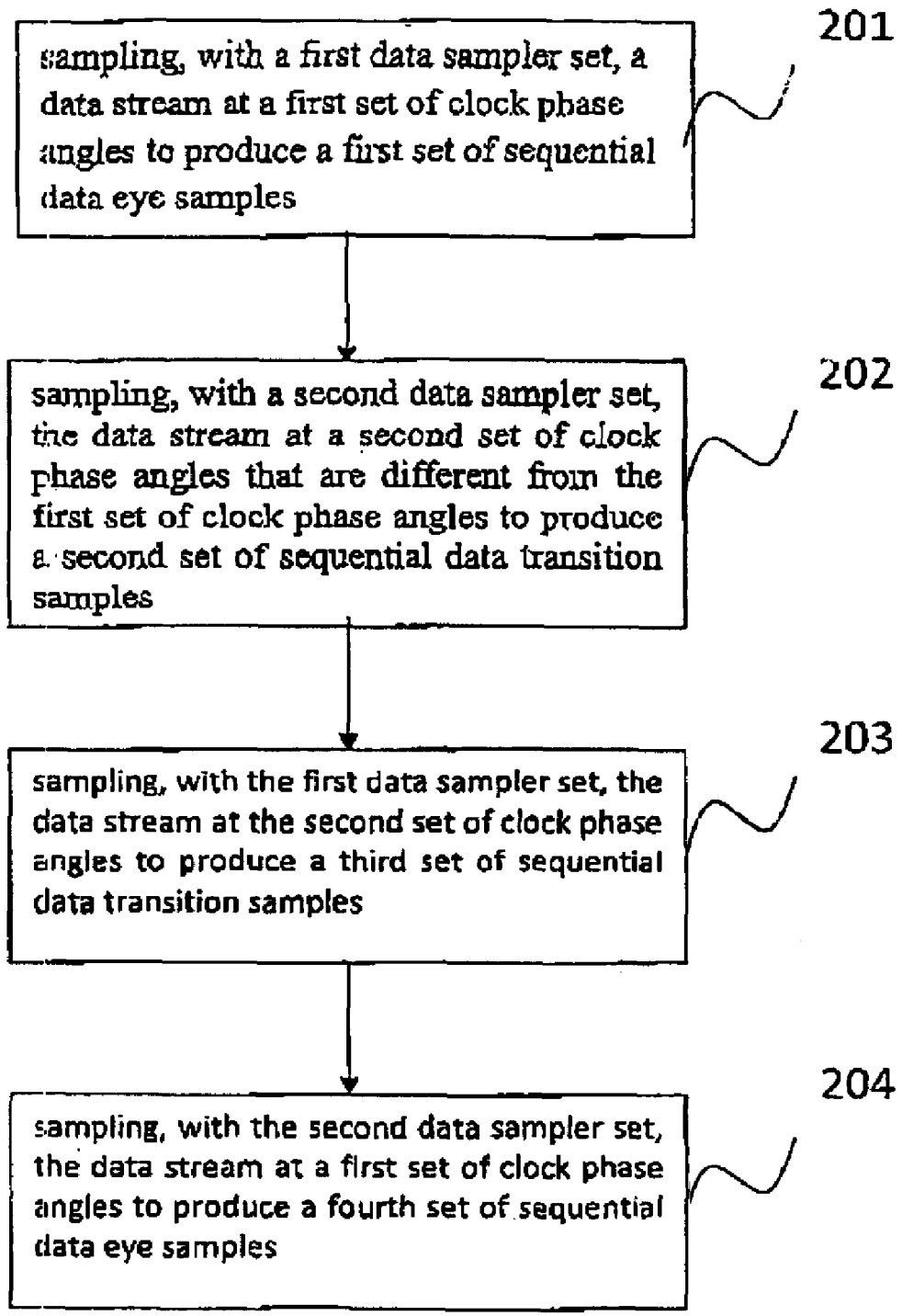
FIG. 2 illustrates generally one embodiment of a method of receiving a high speed data stream according to various aspects of the invention described herein.

FIG. 2 illustrates generally a method of receiving a high speed data stream according to various aspects of the invention described herein. At 201, the method includes sampling, with a first data sampler set, the data stream at a first set of clock phase angles to produce a first set of sequential data eye samples. At 202, the method includes sampling, with a second data sampler set the data stream at a second set of clock phase angles that are different from the first set of clock phase angles to produce a second set of sequential data transition samples. At 203, the method includes sampling, with the first data sampler set, the data stream at the second set of clock phase angles to produce a third set of sequential data transition samples. At 204, the method includes sampling, with the second data sampler set, the data stream at a first set of clock phase angles to produce a fourth set of sequential data eye samples.

Although specific embodiments have been illustrated and/or described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein.

What is claimed:

1. A data sampling system, comprising:
   a first set of data samplers and a second set of data samplers, each set of data samplers having an adjustable quantization threshold;
   a mode sub-system adapted to selectively facilitate mode switching between a first mode and second mode of operation, the first mode of operation causing the first set of data samplers to equate for data transition sampling and the second set of data samplers to operate for data eye sampling, and the second mode of operation causing the first set of data samplers to operate for data eye sampling and the second set of data samplers to operate for data transition sampling in a second mode; and
   a threshold adjustment sub-system adapted to adjust at least one quantization threshold for at least one of the first and second sets of data samplers.

2. The data sampling system of claim 1, wherein the threshold adjustment sub-system is adapted to independently adjust the quantization threshold for each of the first and the second sets data samplers.

3. The data sampling system of claim 1, wherein the threshold adjustment sub-system is adapted to adjust the quantization threshold for the one of the first and the second sets of data samplers hat is operating for data transition sampling.

4. The data sampling system of claim 1, wherein the at least one quantization threshold represents an amplitude distinguishing a first and a second binary logic state.

5. The data sampling system of claim 1, wherein the threshold adjustment sub-system is adapted to adjust the at least one quantization threshold based on consecutive samples of the data eye sampling.

6. The data sampling system of claim 5, wherein the threshold adjustment sub-system is adapted to adjust the at least one quantization threshold based on a data transition having occurred sequentially between the consecutive samples of the data eye sampling.

7. The data sampling system of claim 1, wherein the threshold adjustment sub-system is adapted to adjust the at least one quantization threshold to increase a likelihood that a subsequent data transition will be detected.

8. The data sampling system of claim 1, wherein the threshold adjustment sub-system is adapted to adjust the at least one quantization threshold to increase a likelihood that, in response to a detected subsequent data transition, an output data state of a data sampler toggles with respect to a previous output data state of the data sampler.

9. The data sampling system of claim 1, and further comprising:
   a plurality of clock signals having their phase angles distributed over 360 degrees;
   wherein the mode sub-system changes from a first clocking signal set for the first mode to a second clocking signal set having a different set of phase angles from the first clocking signal set for the second mode.

10. A method of receiving a high-speed data stream, the method comprising:
    sampling, with a first data sampler set, the data stream at a first set of clock phase angles to produce a first set of sequential data eye samples;
    sampling, with a second data sampler set, the data stream at a second set of clock phase angles that are different from the first set of clock phase angles to produce a second set of sequential data transition samples;
    sampling, with the first data sampler set, the data stream at the second set of clock phase angles to produce a third set of sequential data transition samples; and
    sampling, with the second data sampler set, the data stream at a first set of clock phase angles to produce a fourth set of sequential data eye samples.

11. The method of claim 10, and further comprising:
    based at least on the first and third sets of samples, adjusting an input quantization threshold of the first data sampler set.

12. The method of claim 10, and further comprising:
    multiplexing samples to produce a recovered data output that includes the first and fourth sets of data eye samples.

13. A data sampling circuit, comprising:
    a serial data input;
    at least a pair of data samplers adapted to sample the serial data, each having an adjustable input threshold;
    means for supplying phase angle-selectable clock signaling to the data samplers such that the data samplers are individually configurable for data eye sampling or for data transition sampling; and
    means for incrementally adjusting the input threshold for each data sampler based at least in part on previous data samples.

14. The data sampling circuit of claim 13, wherein the adjustment means are adapted to adjust the input threshold for each data sampler so as to increase a sensitivity of each data sampler to a future data transition.

15. The data sampling circuit of claim 13, and further comprising:
    means for selecting between individual data samplers to provide a recovered data output that includes alternating samples from different data samplers.

16. The data sampling circuit of claim 13, further comprising control means for operating at least a pair of data samplers in alternating modes of data eye sampling and data transition sampling.

* * * * *

UNITED STATES PATENT AND TRADEMARK OFFICE
CERTIFICATE OF CORRECTION

| | | |
|---|---|---|
| PATENT NO. | : 7,573,967 B2 | Page 1 of 1 |
| APPLICATION NO. | : 11/173226 | |
| DATED | : August 11, 2009 | |
| INVENTOR(S) | : Alan Fiedler | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 964 days.

Signed and Sealed this

Eleventh Day of January, 2011

David J. Kappos
*Director of the United States Patent and Trademark Office*